A. R. CHRISTIAN.
MACHINE FOR TRIMMING MOLDED ARTICLES.
APPLICATION FILED DEC. 5, 1917.

1,301,651.

Patented Apr. 22, 1919.
2 SHEETS—SHEET 1.

A. R. CHRISTIAN.
MACHINE FOR TRIMMING MOLDED ARTICLES.
APPLICATION FILED DEC. 5, 1917.
1,301,651.
Patented Apr. 22, 1919.
2 SHEETS—SHEET 2.
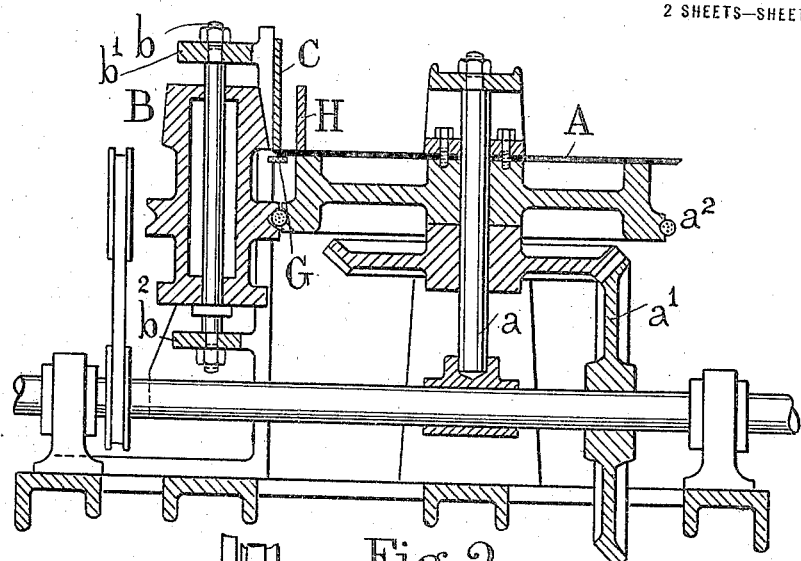
Fig. 2.
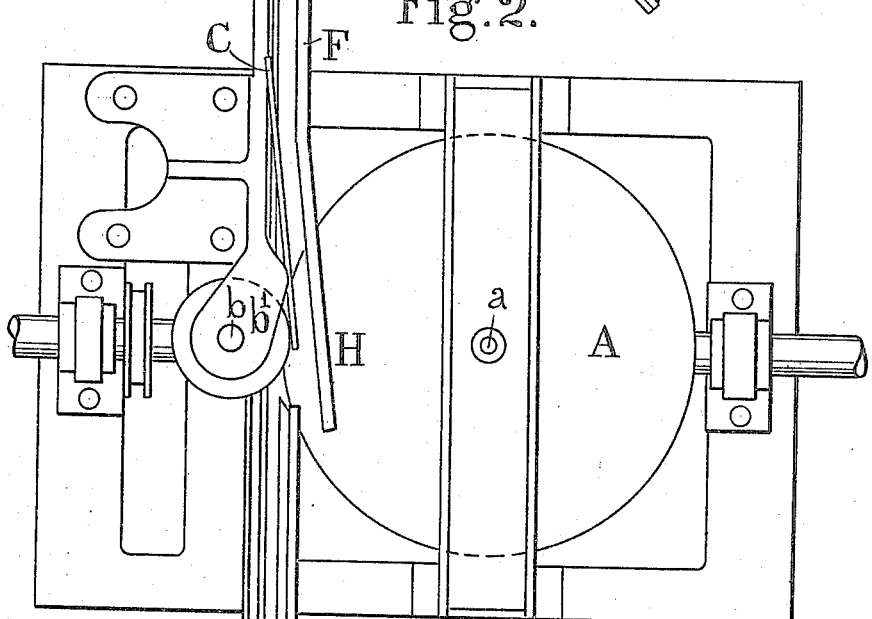
Fig. 3.
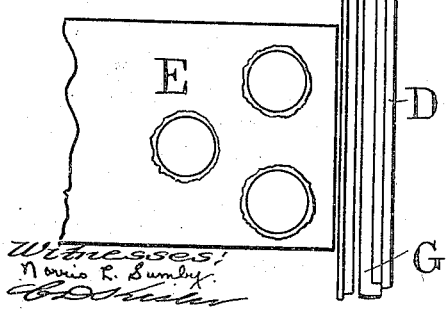
Inventor
Arthur R. Christian

UNITED STATES PATENT OFFICE.

ARTHUR RICHMOND CHRISTIAN, OF HUDDERSFIELD, ENGLAND.

MACHINE FOR TRIMMING MOLDED ARTICLES.

1,301,651.      Specification of Letters Patent.      Patented Apr. 22, 1919.

Application filed December 5, 1917. Serial No. 205,588.

*To all whom it may concern:*

Be it known that I, ARTHUR RICHMOND CHRISTIAN, a British subject, residing at Huddersfield, county of York, England, have invented certain new and useful Improvements in Machines for Trimming Molded Articles, of which the following is a specification.

This invention relates to apparatus for trimming or cutting the edges of molded articles such as rubber disks, heels, soles, tires, pads, or other similarly molded articles vulcanized or otherwise, and sorting such articles as disks, heels, or pads into sizes.

The invention consists essentially in apparatus constructed with an approximately horizontal rotary blade—preferably slightly inclined in one direction—a rotary wheel working in conjunction therewith and an inclined supporting piece placed above the junction of the cutting edges of the rotary blade and wheel to support or hold up the article while being cut to which may be added a traveling band to convey the articles to and from the cutting blade and with or without means whereby disks, heel pads and similar articles may be sorted or graded to size as they pass from the machine.

It will be fully described with reference to the accompanying drawings.

Fig. 2 is a transverse section.

Fig. 3 is a plan.

Upon a vertical or approximately vertical spindle $a$ a circular blade A is mounted to which a rapid rotary movement is imparted. The spindle $a$ is preferably fixed and the blade and gear wheel mounted to rotate thereon on ball or other anti-friction bearings and it is slightly inclined toward the delivery end of the machine to give the surface of the blade a slope in that direction. The blade A is driven by bevel gearing $a'$ or by other suitable gearing or by a band or rope.

Adjacent to the rotary blade A a cutting wheel B is similarly mounted on a spindle $b$ preferably with ball bearings. The spindle $b$ is mounted in brackets $b'$ $b^2$ so as to be adjustable to and from the rotary blade A to compensate for wear in the blade. The spindle $b$ is slightly inclined to adjust it to the correct cutting angle for the article under operation. The wheel B is driven by frictional contact with a friction band $a^2$ around the supporting bracket of the rotary blade A and so as to rotate at about the same surface speed as the latter.

To one side of and adjacent to the rotary wheel B and above the surface of the horizontal cutting blade A an inclined supporting piece C is fitted against the forward inclined edge of which the article is brought during the trimming operation, and by which it is retained in correct position relative to the point of cutting or shearing between the blade and the wheel. The face of the supporting piece C is inclined and may also be somewhat concave or convex or otherwise shaped according to the shape of the article to be trimmed and slightly milled or roughened if desired. At the feed end of the machine a trough shaped incline or chute D is fitted to receive the articles to be trimmed and these may be fed thereto by a flat or horizontal traveling band E upon which they are placed by the operative in charge and delivered into the trough or chute D on their edges, and at the delivery end of the machine a delivery chute F is fitted along which the articles travel when the operation of paring is complete.

In the bottom of the feed chute D an endless traveling band G is fitted to carry the articles forward to the cutting edge of the rotary blade A and wheel B and in the delivery chute a similar traveling band is fitted to carry the articles away from the rotary blade.

The traveling band G is preferably continued the whole length of the machine along the bottom of the chute D up to the cutting edge of the rotary blade A then beneath the blade A and along the bottom of the delivery and sorting chute F a single band serving both to feed the articles to and deliver them from the cutting blades.

A guide piece H extends from the delivery chute F over the rotary blade A and in front of the inclined supporting piece C to direct the articles when trimmed into the delivery and sorting chute F along which they are carried by the conveyer belt G.

Figure 1:
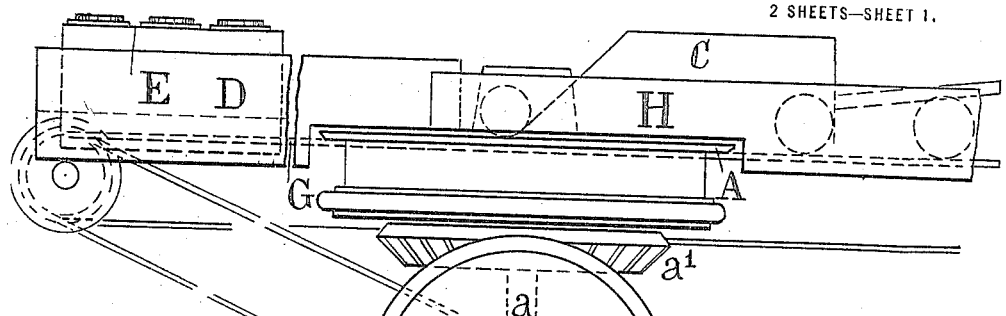
Figure 1 is a side elevation of the apparatus.
Figures 4, 7, 8:
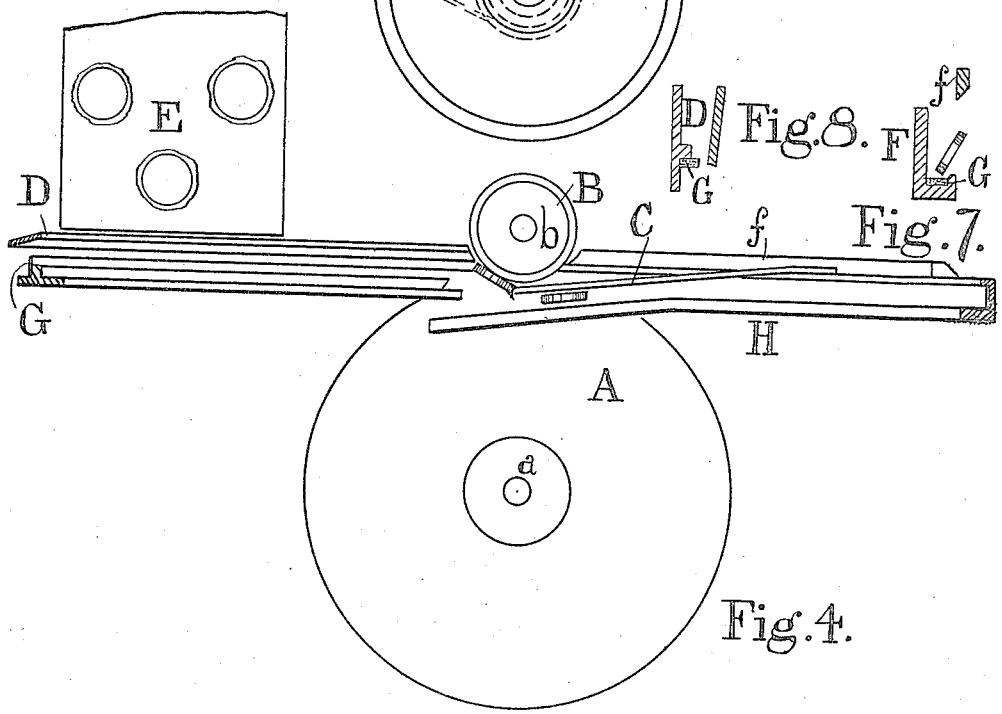
Fig. 4 is a diagrammatic plan partly in section.
Fig. 7 is a transverse section of the discharge appliance.
Fig. 8 is a transverse section of the feed hopper or trough.
Figure 5:
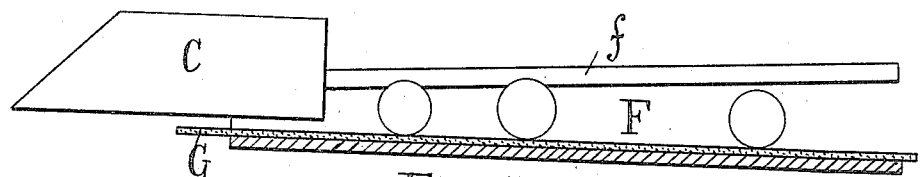
Figs. 5 and 6 are details showing particulars of discharge and sorting appliance.
Figure 6:
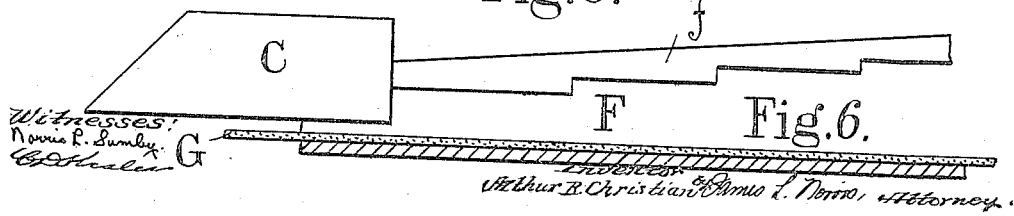

The delivery and sorting chute F is constructed closed at one side and open at the other side with controlling rail or bar $f$ running longitudinally. The rail $f$ gradually diverges from the bottom of the chute increasing the space between it and the bottom, see Fig. 5, or it diverges in steps, see Fig. 6. The article after it is trimmed is directed into the delivery chute F by the guide H and is carried along by the traveling band G, being supported on edge by said band and resting laterally against the rail $f$, until it reaches a point at which the height of the rail above the band G is greater than the diameter of the article, whereupon it loses the lateral support of the rail $f$ and falls off into a suitably positioned receptacle. Various sizes are thus graded the smaller ones falling off first and the larger ones being carried farther fall into a separate receptacle.

Where a delivery and sorting chute are not required the articles when trimmed will be carried forward by the rotation of the blade and thrown off by the centrifugal action into a receptacle placed at one side.

It will be understood that the machine may be made of different sizes to suit various articles. The automatic feed conveyer and sorting delivery conveyer is principally designed for articles such as rubber heel disks or pads, larger articles such as tires may be fed in and removed by hand the conveyers being dispensed with if desired.

In operation the molded article to be cut or trimmed around its edge is fed by hand or by the conveyer E into the chute D and on to the conveyer band G resting thereon upon its edge, the superfluous material to be cut or trimmed off projecting down at the side of the band. The conveyer band G delivers the article upon the rotary blade A at the junction of the cutting wheel B with the blade A and the material to be cut off is severed between the two.

During the cutting operation the advance of the article is prevented by engagement of the attached superfluous material with the cutting members A and B, the inclined forward edge of the supporting piece C holding and supporting said article in the most favorable position for the operation of said cutting members, and the movement of the blade A giving to the article a rotary movement about its own axis. When the cutting or trimming of the edge is complete and the superfluous material completely severed, the article is released the rotary movement of the blade again carries it forward past the end of the piece C, the guide H directing it on to the conveyer band G in the bottom of the delivery chute F.

What I claim as my invention and desire to protect by Letters Patent is:—

1. A machine for trimming or cutting the edges of molded articles of rubber or other composition constructed with an approximately horizontal rotary blade mounted on an approximately vertical spindle, a cutter wheel mounted on an approximately vertical spindle working in conjunction with rotary blade and a chute to deliver the articles on to the top of the rotary blade near its point of contact with the cutter wheel substantially as described.

2. A machine for trimming or cutting the edges of molded articles of rubber or other composition constructed with a rotary blade slightly inclined to the horizontal mounted upon a spindle slightly inclined to the vertical, a cutter wheel working in conjunction therewith mounted on a spindle capable of adjustment a chute to deliver the articles on to the top of the rotary blade near its point of contact with the cutter wheel and a supporting piece to retain the article in position during the operation of trimming substantially as described.

3. A machine for trimming or cutting the edges of molded articles as in claim 1 characterized by the combination with the rotary blade and cutting wheel of a vertical supporting piece with inclined forward edge placed above the rotary blade to retain the article in position while being trimmed substantially as described.

4. A machine for trimming or cutting the edges of molded articles as in claim 1 characterized by the combination with the rotary blade and cutting wheel of an endless traveling belt and chute to feed the articles to the cutting blades and deliver them from the machine substantially as described.

5. A machine for trimming or cutting the edges of molded articles as in claim 1 characterized by the combination with the rotary blade and cutting wheel of a delivery and sorting chute provided with a traveling conveyer band and open at one side with a diverging supporting rail or bar to permit of the articles falling off according to their size into receptacles substantially as described.

In testimony whereof I have hereunto set my hand in presence of two subscribing witnesses.

ARTHUR RICHMOND CHRISTIAN.

Witnesses:
J. H. JONES,
ARTHUR J. THOMAS.